US008798910B2

(12) United States Patent
Osogami

(10) Patent No.: US 8,798,910 B2
(45) Date of Patent: Aug. 5, 2014

(54) METHOD, APPARATUS AND COMPUTER PROGRAM FOR ESTIMATING DRIVER'S PERSONALITY OF ROUTE SELECTION

(71) Applicant: International Business Machines Corporation, Armonk, NY (US)

(72) Inventor: Takayuki Osogami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 13/732,657

(22) Filed: Jan. 2, 2013

(65) Prior Publication Data
US 2013/0184992 A1  Jul. 18, 2013

(30) Foreign Application Priority Data
Jan. 17, 2012  (JP) .................................. 2012-007329

(51) Int. Cl.
*G01C 21/34* (2006.01)
(52) U.S. Cl.
USPC .............................. 701/400; 701/533; 701/26
(58) Field of Classification Search
USPC ............. 701/400, 527, 533, 409–411, 117–8, 701/23, 25–26, 423; 340/988
See application file for complete search history.

(56) References Cited

U.S. PATENT DOCUMENTS

| 5,608,635 | A  | * | 3/1997 | Tamai ........................... 701/428 |
| 6,421,602 | B1 | * | 7/2002 | Bullock et al. ................ 701/421 |
| 2002/0087262 | A1 | * | 7/2002 | Bullock et al. ................ 701/202 |
| 2006/0122771 | A1 | * | 6/2006 | Mikuriya et al. ............. 701/210 |
| 2008/0004791 | A1 | * | 1/2008 | Sera ............................. 701/117 |

FOREIGN PATENT DOCUMENTS

| JP | 06-131593 | | 5/1994 |
| JP | 11-272983 | | 10/1999 |
| JP | 2005-181152 | | 7/2005 |
| JP | 2007-255919 | A | 10/2007 |
| JP | 2009-002817 | A | 1/2009 |
| JP | 2009-042051 | | 2/2009 |
| JP | 2010-140135 | A | 6/2010 |
| JP | 2010-237158 | | 10/2010 |

* cited by examiner

*Primary Examiner* — Yonel Beaulieu
(74) *Attorney, Agent, or Firm* — Cantor Colburn LLP

(57) ABSTRACT

A method for selecting a route from a departure point to an arrival point includes acquiring information concerning a departure point and an arrival point and information concerning a route from the departure point to the arrival point; generating a plurality of basic routes; calculating a parameter of an evaluation function that yields the selected route as an optimum route; generating a new route using the calculated parameter, determining whether or not the generated new route is identical to the selected route; on a condition that the generated new route is not identical to the selected route, adding the generated new route to the basic routes, recalculating the parameter, generating a new route, and comparing the new route with the selected route; and if the new route is identical to the selected route, storing the parameter when the new data becomes identical to the selected route.

14 Claims, 8 Drawing Sheets

METHOD, APPARATUS AND COMPUTER PROGRAM FOR ESTIMATING DRIVER'S PERSONALITY OF ROUTE SELECTION

PRIORITY

This application claims priority to Japanese Patent Application No. 2012-007329, filed 17 Jan. 2012, and all the benefits accruing therefrom under 35 U.S.C. §119, the contents of which in its entirety are herein incorporated by reference.

BACKGROUND

The present disclosure relates to a method, an apparatus and a computer program that determines a driver's pattern of route selection and estimates the personality of the driver's route selection.

Today's automobile navigation systems have route selection algorithms creatively designed in various ways and are capable of selecting a route that is optimal for a driver and presenting the route to the driver. For example, many route selection models generate multiple candidate routes beforehand and select a route that is most likely to be taken among the candidates routes are being used.

On the other hand, techniques to select a route based on probe data have been developed in the field of automobile traffic systems. For example, JP2009-002817A and JP2010-140135A disclose route search systems that acquire probe data and provide a recommended route which is a route with the highest evaluated value or a more effective route among all possible routes from a departure point to a destination. JP2007-255919A discloses a route guidance apparatus capable of selecting a route at an intersection on the basis of the driving skills of a driver by taking into consideration the difference in cost between right and left turns.

SUMMARY

In one embodiment, a method for estimating a parameter of an evaluation function used for selecting a route from a departure point to an arrival point includes acquiring, with a processing device, information concerning a departure point and an arrival point and information concerning a route from the departure point to the arrival point; generating a plurality of basic routes on the basis of the acquired information concerning the departure point and the arrival point and the acquired information concerning the route from the departure point to the arrival point; acquiring information concerning a route actually selected; calculating a parameter of an evaluation function that yields the actually selected route as an optimum route among the plurality of basic routes and the actually selected route; generating a new route using the calculated parameter determining whether or not the generated new route is identical to the actually selected route; on a condition that it is determined that the generated new route is not identical to the actually selected route, adding the generated new route to the basic routes, calculating a parameter of the evaluation function anew, repeating generation of a new route, and comparing the generated new route with the actually selected route; and on a condition that it is determined that the generated new route is identical to the actually selected route, storing the parameter at the time when the new data becomes identical to the actually selected route as a parameter of the evaluation function.

In another embodiment, an apparatus for estimating a parameter of an evaluation function used for selecting a route from a departure point to an arrival point includes an information acquisition unit configured to acquire information concerning a departure point and an arrival point and information concerning a route from the departure point to the arrival point; a basic route generation unit configured to generate a plurality of basic routes on the basis of the acquired information concerning the departure point and the arrival point and the acquired information concerning the route from the departure point to the arrival point; a route selection information acquisition unit configured to acquire information concerning a route actually selected; a parameter calculation unit configured to calculate a parameter of an evaluation function that yields the actually selected route as an optimum route among the plurality of basic routes and the actually selected route; a route generation unit configured to generate a new route using the calculated parameter; a determination unit configured to determine whether or not the generated new route is identical to the actually selected route; a repetition unit configured to, on a condition that the determination unit determines that the generated new route is not identical to the actually selected route, add the generated new route to the basic routes, calculate a parameter of the evaluation function anew, repeat generation of a new route, and compare the generated new route with the actually selected route; and a parameter storage unit configured to, on a condition that the determination unit determines that the generated new route is identical to the actually selected route, store the parameter at the time when the new data becomes identical to the actually selected route as a parameter of the evaluation function.

In another embodiment, a computer readable storage medium has computer readable code stored thereon that, when executed by a computer, implement method for estimating a parameter of an evaluation function used for selecting a route from a departure point to an arrival point. The method includes acquiring, with a processing device, information concerning a departure point and an arrival point and information concerning a route from the departure point to the arrival point; generating a plurality of basic routes on the basis of the acquired information concerning the departure point and the arrival point and the acquired information concerning the route from the departure point to the arrival point; acquiring information concerning a route actually selected; calculating a parameter of an evaluation function that yields the actually selected route as an optimum route among the plurality of basic routes and the actually selected route; generating a new route using the calculated parameter; determining whether or not the generated new route is identical to the actually selected route; on a condition that it is determined that the generated new route is not identical to the actually selected route, adding the generated new route to the basic routes, calculating a parameter of the evaluation function anew, repeating generation of a new route, and comparing the generated new route with the actually selected route; and on a condition that it is determined that the generated new route is identical to the actually selected route, storing the parameter at the time when the new data becomes identical to the actually selected route as a parameter of the evaluation function.

In another embodiment, a method for estimating a parameter of an evaluation function used for selecting one element or a combination of a plurality of elements includes acquiring, with a processing device, information concerning each of the elements; generating a basic set including a selectable one element or a selectable combination of a plurality of elements on the basis of the acquired information concerning each of the elements; acquiring information concerning one actually selected element or an actually selected combination of a plurality of elements; and calculating a parameter of the

DETAILED DESCRIPTION

Figure 1:
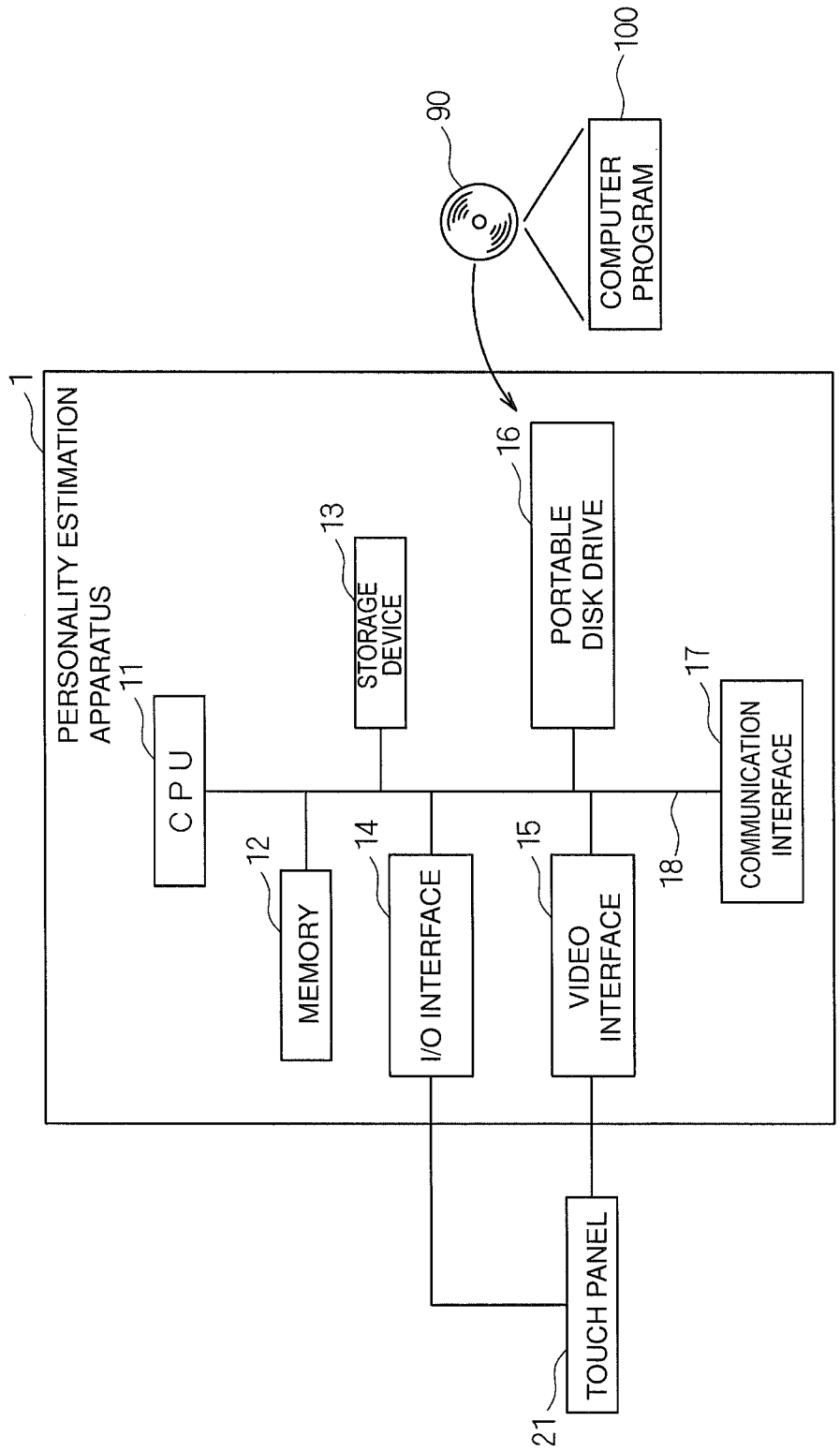
FIG. 1 is a block diagram illustrating a configuration of a personality estimating apparatus according to a first embodiment.

Different drivers have different personalities. The traffic simulations executed based on route selection methods as described in the above mentioned publications have a problem in that the simulations materially differ from real traffic situations. That is, parameters of a traffic simulation model need to be calibrated before execution in order to approximate the traffic simulation model to a real traffic situation. Parameters of traffic simulation models include many parameters such as parameters of a route selection model and parameters of a trip generation model, making calibration difficult in general.

To efficiently perform calibration, the personality of each individual driver needs to be estimated and a route selection model needs to be built based on the results of the estimation of the personalities of many drivers. However, conventional route selection methods have a problem in that they cannot properly model the personalities of drivers.

The present embodiments have been made in light of these circumstances and provide a method, an apparatus and a computer program for estimating the personality of a driver's route selection that are capable of estimating the personality of each individual driver, building a route selection model for driver's route selection, and performing a traffic simulation close to reality.

A route according to the personality of the driver can be selected because the driver's personality can be readily generated in a traffic simulation. Furthermore, since parameters that match routes actually selected by each individual driver are calculated and a determination can be readily made as to whether a route selection model based on the calculated parameters is proper or not can be readily made, calibration can be relatively readily performed before the execution of a traffic simulation.

To achieve this, a method according to a first aspect is executable on an apparatus estimating a parameter of an evaluation function used for selecting a route from a departure point to an arrival point. The method includes: acquiring information concerning a departure point and an arrival point and information concerning a route from the departure point to the arrival point; generating a plurality of basic routes on the basis of the acquired information concerning the departure point and the arrival point and the acquired information concerning the route from the departure point to the arrival point; acquiring information concerning a route actually selected; calculating a parameter of an evaluation function that yields the actually selected route as an optimum route among the plurality of basic routes and the actually selected route; generating a new route using the calculated parameter; determining whether or not the generated new route is identical to the actually selected route; when it is determined that the generated new route is not identical to the actually selected route, adding the generated new route to the basic routes, calculating a parameter of the evaluation function anew, repeating generation of a new route, and comparing the generated new route with the actually selected route; and when it is determined that the generated new route is identical to the actually selected route, storing the parameter at the time when the new data becomes identical to the actually selected route as a parameter of the evaluation function.

According to a second aspect, the information concerning the route from the departure point to the arrival point in the method of the first aspect is acquired as a cost incurred if the route is selected, and the parameter is calculated as a coefficient by which the cost of each route in the evaluation function is to be multiplied, by optimizing the evaluation function by a linear programming.

According to a third aspect, the basic route in the method of the first or second aspect includes at least a route with the fewest left and/or right turns, a fastest route, and a shortest route.

An apparatus according to a fourth aspect estimates a parameter of an evaluation function used for selecting a route from a departure point to an arrival point. The apparatus includes: an information acquisition unit configured to acquire information concerning a departure point and an arrival point and information concerning a route from the departure point to the arrival point; a basic route generation unit configured to generate a plurality of basic routes on the basis of the acquired information concerning the departure point and the arrival point and the acquired information concerning the route from the departure point to the arrival point; a route selection information acquisition unit configured to acquire information concerning a route actually selected; a parameter calculation unit configured to calculate a parameter of an evaluation function that yields the actually selected route as an optimum route among the plurality of basic routes and the actually selected route; a route generation unit configured to generate a new route using the calculated parameter; a determination unit configured to determine whether or not the generated new route is identical to the actually selected route; a repetition unit configured to, when the determination unit determines that the generated new route is not identical to the actually selected route, add the generated new route to the basic routes, calculate a parameter of the evaluation function anew, repeat generation of a new route, and compare the generated new route with the actually selected route; and a parameter storage unit configured to, when the determination unit determines that the generated new route is identical to the actually selected route, store the parameter at the time when the new data becomes identical to the actually selected route as a parameter of the evaluation function.

According to a fifth aspect, the information acquisition unit of the apparatus of the fourth aspect acquires the information concerning the route from the departure point to the arrival point as a cost incurred if the route is selected, and the parameter calculation unit calculates the parameter as a coefficient by which the cost of each route in the evaluation function is to be multiplied, by optimizing the evaluation function by a linear programming.

According to a sixth aspect, the basic routes in the apparatus of the fourth or fifth aspect include at least a route with the fewest left and/or right turns, a fastest route, and a shortest route.

A computer program in a seventh aspect is executable on an apparatus estimating a parameter of an evaluation function used for selecting a route from a departure point to an arrival point. The computer program causes the apparatus to function as: an information acquisition unit configured to acquire information concerning a departure point and an arrival point and information concerning a route from the departure point to the arrival point; a basic route generation unit configured to generate a plurality of basic routes on the basis of the acquired information concerning the departure point and the arrival point and the acquired information concerning the route from the departure point to the arrival point; a route selection information acquisition unit configured to acquire information concerning a route actually selected; a parameter calculation unit configured to calculate a parameter of an evaluation function that yields the actually selected route as an optimum route among the plurality of basic routes and the actually selected route; a route generation unit configured to generate a new route using the calculated parameter; a determination unit configured to determine whether or not the generated new route is identical to the actually selected route; a repetition unit configured to, when the determination unit determines that the generated new route is not identical to the actually selected route, add the generated new route to the basic routes, calculate a parameter of the evaluation function anew, repeat generation of a new route, and compare the generated new route with the actually selected route; and a parameter storage unit configured to, when the determination unit determines that the generated new route is identical to the actually selected route, store the parameter at the time when the new data becomes identical to the actually selected route as a parameter of the evaluation function.

According to an eighth aspect, the computer program of the seventh aspect causes the information acquisition unit to function as unit configured to acquire the information concerning the route from the departure point to the arrival point as a cost incurred if the route is selected, and cause the parameter calculation unit to function as unit configured to calculate the parameter as a coefficient by which the cost of each route in the evaluation function is to be multiplied, by optimizing the evaluation function by a linear programming.

According to a ninth aspect, in the computer program of the seventh or eighth aspect, the basic routes include at least a route with the fewest left and/or right turns, a fastest route, and a shortest route.

A method according to a tenth aspect is a method for estimating a parameter of an evaluation function used for selecting one element or a combination of a plurality of elements. The method includes: acquiring information concerning each of the elements; generating a basic set including a selectable one element or a selectable combination of a plurality of elements on the basis of the acquired information concerning each of the elements; acquiring information concerning one actually selected element or an actually selected combination of a plurality of elements; and calculating a parameter of the evaluation function that yields the actually selected one element or the actually selected combination of a plurality of elements as an optimum one among the basic set.

According to an eleventh aspect, each of the elements in the method of the tenth aspect is a road between two intersections and the one element or the combination of a plurality of elements is a route that is a combination of the roads.

According to a twelfth aspect, the method of the tenth or eleventh aspect includes generating one element or a combination of a plurality of elements anew by using a calculated parameter of the evaluation function, adding the generated new one element or combination of elements to the basic set, and calculating a parameter of the evaluation function that yields actually selected one element or an actually selected combination of elements as an optimum element or combination in the basic set including the generated new one element or combination of elements.

According to a thirteenth aspect, the method of the twelfth aspect recursively repeats generating one element or a combination of a plurality of elements anew by using a calculated parameter of the evaluation function, adding the generated new one element or combination of elements to the basic set, and calculating a parameter of the evaluation function that yields actually selected one element or an actually selected combination of elements as an optimum element or combination in the basic set including the generated new one element or combination of elements.

According to a fifteenth aspect, the method of the thirteenth aspect includes determining whether or not a generated new one element or combination of a plurality or elements is identical to actually selected one element or combination of elements and, when the generated new one element or combination of elements are determined to be identical to the actually selected element or combination of elements, storing a parameter at the time when the element or combination of elements becomes identical to the actually selected element or combination of elements as a parameter of the evaluation function.

An apparatus estimating the personality of a driver's route selection according to embodiments will be described below in detail with reference to drawings. It will be understood that the embodiments described below are not intended to limit the claims and not all combinations of features described in the embodiments are essential to the inventive solution.

The present embodiments can be carried out in many different modes and should not be interpreted as being limited to the embodiments described herein. Throughout the embodiments, like elements are given like reference signs.

While apparatuses which are computer systems in which a computer program is installed will be described in the following embodiment, part of the present embodiments can also be implemented as a computer program executable on a computer as will be apparent to those skilled in the art. Accordingly, the present embodiments can be embodied as hardware, which is an apparatus estimating the personality of a driver's route selection, or as software estimating the personality of a driver's route selection, or as a combination of such software and hardware. The computer program can be recorded on any computer-readable recording medium such as a hard disk, DVD, CD, optical storage device, or magnetic storage device.

According to embodiments, the personality of a driver can be readily estimated and therefore a route according to the personality of the driver can be generated in a traffic simulation. Furthermore, parameters that match a route actually selected by each individual driver can be calculated and whether a route selection model based on the calculated parameters is proper or not can be readily determined.

Before a traffic simulation is performed, parameters of a traffic simulation model need to be calibrated to make the traffic simulation model close to real traffic situations. There are many parameters of a traffic simulation model, including parameters of a route selection model and parameters of a trip generation model and accordingly it is usually difficult to calibrate the parameters.

By carrying out the present embodiments, the personality of each individual driver can be estimated from probe data, a route selection model can be built from the estimated personalities of many drivers, and the built route selection model can be verified by a statistical approach. Using the built and verified route selection model in a traffic simulation model enables more efficient calibration because only parameters other than the parameters of the route selection model need to be calibrated.

FIG. 1 is a block diagram illustrating a configuration of a personality estimation apparatus according to a first embodiment. The personality estimation apparatus 1 according to the first embodiment includes at least a CPU (central processing unit) 11, a memory 12, a storage device 13, an I/O interface 14, a video interface 15, a portable disk drive 16, a communication interface 17, and an internal bus 18 interconnecting the hardware components given above.

The CPU 11 is connected with the hardware components of the personality estimation apparatus 1 given above through the internal bus 18, controls the operation of the hardware components and executes various software functions in accordance with a computer program 100 stored in the storage device 13. The memory 12 is implemented by a volatile memory such as an SRAM or SDRAM, in which a load module is loaded at the time of execution of the computer program 100 and temporary data produced during execution of the computer program 100 is stored.

The storage device 13 is implemented by storage such as built-in fixed storage device (hard disk) or a ROM. The computer program 100 stored on the storage device 13, which is downloaded from a portable recording medium 90 such as a DVD or a CD-ROM on which information such as the program and data are recorded through a portable disk drive 16, is loaded from the storage device 13 onto the memory 12, where the program 100 is executed. The computer program 100 may be downloaded from an external computer connected through a communication interface 17.

The communication interface 17 is connected to the internal bus 18 and is capable of sending and receiving data to and from an external computer through connection to an external network such as the Internet, a LAN, or a WAN.

The I/O interface 14 and the video interface 15 are connected to a touch panel 21 implemented by a liquid-crystal display or other display and accept inputs of information while displaying a given image. An input device such as a keyboard and/or mouse may be connected separately for accepting inputs.

Figure 2:
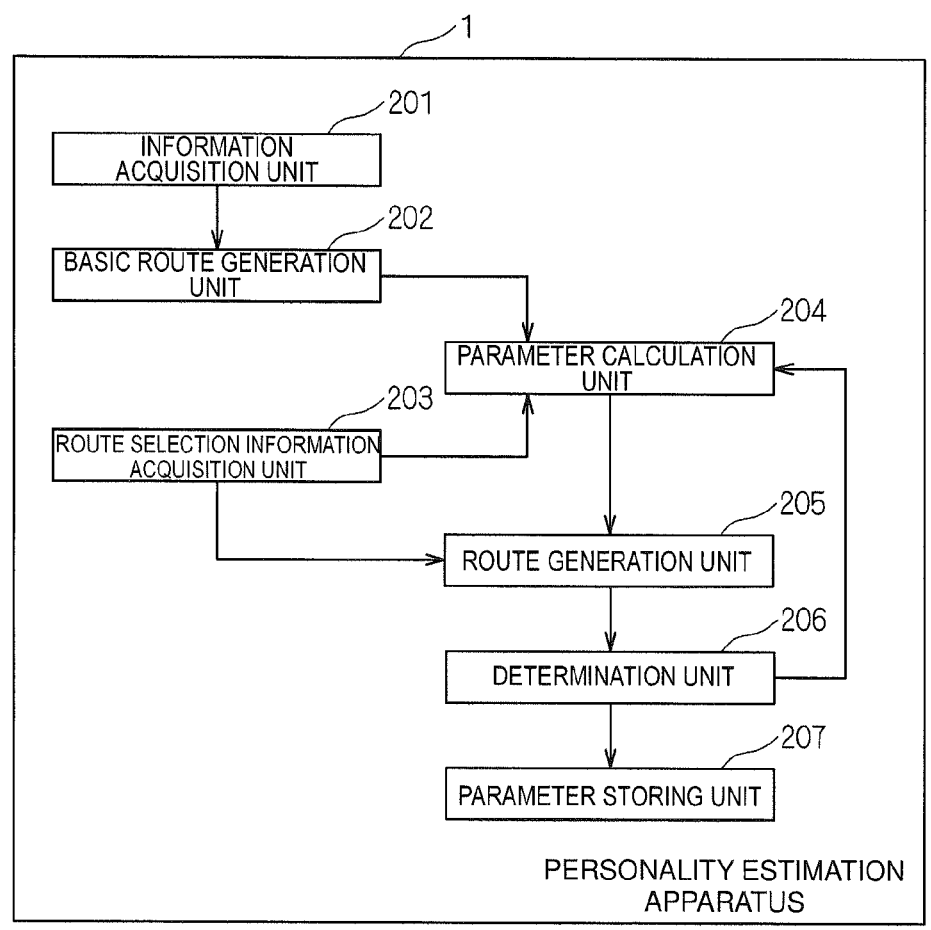
FIG. 2 is a functional block diagram of the personality estimation apparatus according to the first embodiment.

FIG. 2 is a functional block diagram of the personality estimation apparatus 1 according to the first embodiment. An information acquisition unit 201 of the personality estimation apparatus 1 acquires information concerning a departure point and an arrival point and the routes that can be taken from the departure point to the arrival point. Information acquired includes positional information concerning the departure point, positional information concerning the arrival point, and information concerning routes that can be taken, for example, information concerning intersections and distances, expected values of amounts of required time determined by taking into account the probability of congestion.

Figure 3:
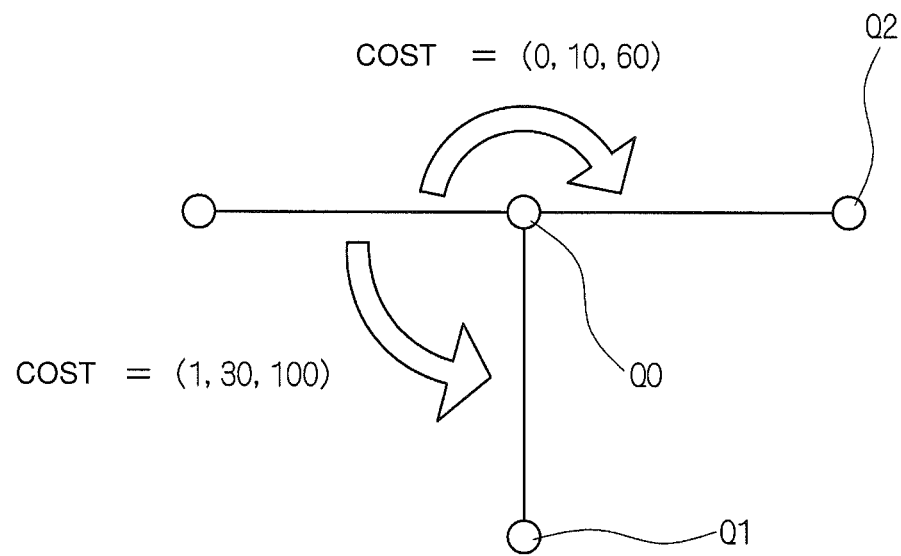
FIG. 3 is a diagram illustrating costs acquired by the personality estimation apparatus according to the first embodiment.

In the first embodiment, a cost between adjacent intersections is acquired as information concerning routes that can be taken. The cost herein is a vector value including the number of right and left turns, the time required to reach the next intersection, and the distance to the next intersection. FIG. 3 illustrates an example of costs acquired by the personality estimation apparatus 1 according to the first embodiment.

As illustrated in FIG. 3, the cost, (0, 10, 60), required to go straight from intersection Q0 to intersection Q2 is acquired. The first number is a value representing whether a right or left turn is made. In the first embodiment, '1' represents that a right or left turn is made and '0' represents that neither right nor left turn is made. The second number is a value indicating the time required to reach the next intersection. In the first embodiment, for example '10' represents 10 minutes where the unit time is one minutes. The last number is a value indicating the distance to the next intersection Q2. In the first embodiment, for example '60' represents 6 km where the unit distance is 100 m. Likewise, the cost required to travel to intersection Q1 by making a right turn is acquired as (1, 30, and 100).

Returning to FIG. 2, a basic route generation unit 202 generates a plurality of basic routes on the basis of acquired information concerning departure and arrival points and information concerning routes from the departure point to the arrival point. For example, if the personality of an automobile driver is to be estimated, basic routes preferably include at least the route with the fewest right and left turns, the fastest route, and the shortest route.

Figure 4:
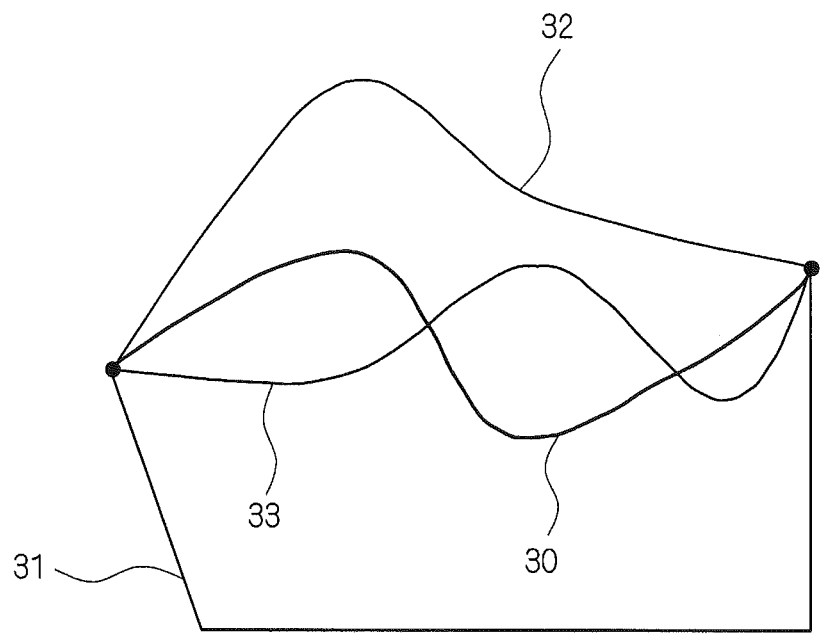
FIG. 4 is a diagram illustrating basic routes generated in the personality estimation apparatus according to the first embodiment.

FIG. 4 is a diagram illustrating basic routes generated in the personality estimation apparatus 1 according to the first embodiment. As illustrated in FIG. 4, the route 31 with the fewest right/left turns, the fastest route 32 that requires the shortest time to reach the arrival point, and a shortest route 33 with the shortest distance to the arrival point are generated as a basic route in addition to a route 30 actually selected by a driver. Usually, the actually selected route 30 is a route selected based on a combination of properties of the route 31 with the fewest right/left turns, the fastest route 32 and the shortest route 33 and therefore reflects the personality of the driver. That is, a preference among the three factors, namely a fewer right/left turns, a shorter time to travel to the arrival point, and a shorter distance (travel distance), can be estimated.

However, if there are no differences among the route 31 with the fewest right/left turns, the fastest route 32, and the shortest route 33, the personality of the driver cannot be estimated. In that case, the actually selected route 30 may be excluded from the routes from which the personality of the driver is estimated.

Returning to FIG. 2, a route selection information acquisition unit 203 acquires information concerning a route actually selected. Specifically, the route selection information acquisition unit 203 acquires information concerning which routes have been selected in the course from a departure point to an arrival point.

A parameter calculation unit 204 calculates parameters of an evaluation function that yield a route actually selected as the optimum route among a plurality of basic routes and the actually selected route. Here, the parameters of the evaluation function are coefficients by which a cost of each route in the evaluation function is to be multiplied and values which can be determined by obtaining the optimum solution to a linear programming problem by a simplex method to optimize the evaluation function according to the first embodiment.

Specifically, parameters $(\alpha_0, \alpha_1, \alpha_2)$ that yield an actually selected route as an optimum evaluation value of the evaluation function $f(\alpha_0, \alpha_1, \alpha_2)$ shown in Formula 1 are calculated. The sum of the parameters, $\alpha_0, \alpha_1$ and $\alpha_2$, is '1'. Parameter $\alpha_0$ represents the parameter for the number of right/left turns, parameter $\alpha_1$ represents the parameter for the arrival time, and parameter $\alpha_2$ represents the parameter for the distance. That is, it can be determined based on the proportion of the magnitudes of parameters $\alpha_0, \alpha_1$ and $\alpha_2$ which of fewer right/left turns, a shorter time required to travel to the arrival point, and shorter travel distance the driver prefers.

In Formula 1, i is a natural number that distinguishes among a plurality of routes, 1, 2, and so on. $C_0^{(i)}$ represents the number of right/left turns along a route i, $C_1^{(i)}$ represents the time required to arrive at the arrival point along the route i, and $C_2^{(i)}$ represents the travel distance along the route i. $C_0^{(i)}$, $C_1^{(i)}$ and $C_2^{(i)}$ are values normalized by dividing by the smallest number of right/left turns $S_0$, the shortest time required to travel to the arrival point $S_1$ and the shortest distance to the arrival point $S_2$, respectively. The parameters $(\alpha_0, \alpha_1, \alpha_2)$ are positive real numbers smaller than or equal to 1 and the sum of the parameters is '1'.

Formula 1

$$f(\alpha_0,\alpha_1\alpha_2)=\alpha_0 C_0^{(i)}/S_0+\alpha_1 C_1^{(i)}/S_1+\alpha_2 C_2^{(i)}/S_2 \quad \text{(Formula 1)}$$

The parameters $(\alpha_0, \alpha_1, \alpha_2)$ in the evaluation function $f(\alpha_0, \alpha_1, \alpha_2)$ in Formula 1 that yield the actually selected route as an optimum route can be calculated by solving the linear programming problem shown in Formula 2. In particular, it is only necessary to calculate the parameters that minimize the difference $\epsilon$ between an evaluation value calculated for a basic route and an evaluation value calculated for the route actually selected.

Formula 2

$$\min. \varepsilon \quad \text{(Formula 2)}$$

$$\text{s.t.} \sum_{j=0}^{2} \alpha_j = 1$$

$$\alpha_j \geq 0, \text{ for } j = 0, 1, 2$$

$$\sum_{j=0}^{2} \frac{C_j^{(i)}}{S_j}\alpha_j + \varepsilon \geq \sum_{j=0}^{2} \frac{C_j^{(0)}}{S_j}\alpha_j, \text{ for } i = 1, 2, \ldots$$

The first term on the left-hand side of the fourth formula in Formula 2 represents the sum of the costs calculated for the basic routes; the right-hand side represents the sum of the costs calculated for a route actually selected, and $\epsilon$ represents the difference between the sums. Parameters $(\alpha_0, \alpha_1, \alpha_2)$ that yield the smallest difference $\epsilon$ are simply calculated.

The personality of the driver can be more effectively reflected in the optimum solution to the linear programming problem by obtaining as the solution to a quadratic programming problem. The solution to the quadratic programming problem can be obtained according to Formula 3. Formula 3 is similar to Formula 2 except that the second term is added to the first formula in Formula 2.

[Formula 3]

$$\min. \varepsilon + \lambda \sum_{j=0}^{2} \alpha_j^2 \quad \text{(Formula 3)}$$

$$\text{s.t.} \sum_{j=0}^{2} \alpha_j = 1$$

$$\alpha_j \geq 0, \text{ for } j = 0, 1, 2$$

$$\sum_{j=0}^{2} \frac{C_j^{(i)}}{S_j}\alpha_j + \varepsilon \geq \sum_{j=0}^{2} \frac{C_j^{(0)}}{S_j}\alpha_j, \text{ for } i = 1, 2, \ldots$$

If the second term is not added, for example if the parameters (⅓, ⅓, ⅓) and the parameters (1, 0, 0) are optimum solutions, (1, 0, 0) is taken as the optimum solution by the simplex algorithm. However, (⅓, ⅓, ⅓) is the only optimum solution to the quadratic programming problem having the second term added.

If the second term is not added, that is, the linear programming program is solved by the simplex method; the number of right/left turns is minimized as can be seen from the optimum solution, (1, 0, and 0). However, the time required to travel to the arrival point and the distance to the arrival point are not necessarily minimized. On the other hand, if the optimum solution to the quadratic programming problem is (1, 0, 0), for example, it is apparent that the number of right/left turns is minimized but it is also apparent that the time required to arrive and the travel distance are not minimized. By adding the second term, which of the three parameter elements ($\alpha_0, \alpha_1, \alpha_2$) is considered can be included in the evaluation and the personality can be estimated with a higher degree of accuracy.

Returning to FIG. 2, a route generation unit 205 uses the calculated parameters to generate a new route. The generated route is dependent on the personality of the driver. In particular, weights w for the calculated parameters ($\alpha_0, \alpha_1, \alpha_2$) are calculated first according to Formula 4 and then a cost vector between intersections are replaced with the costs weighted with w.

Formula 4

$$(w_0,w_1,w_2)=(\alpha_0/S_0,\alpha_1/S_1,\alpha_2/S_2) \quad \text{(Formula 4)}$$

Figure 5:
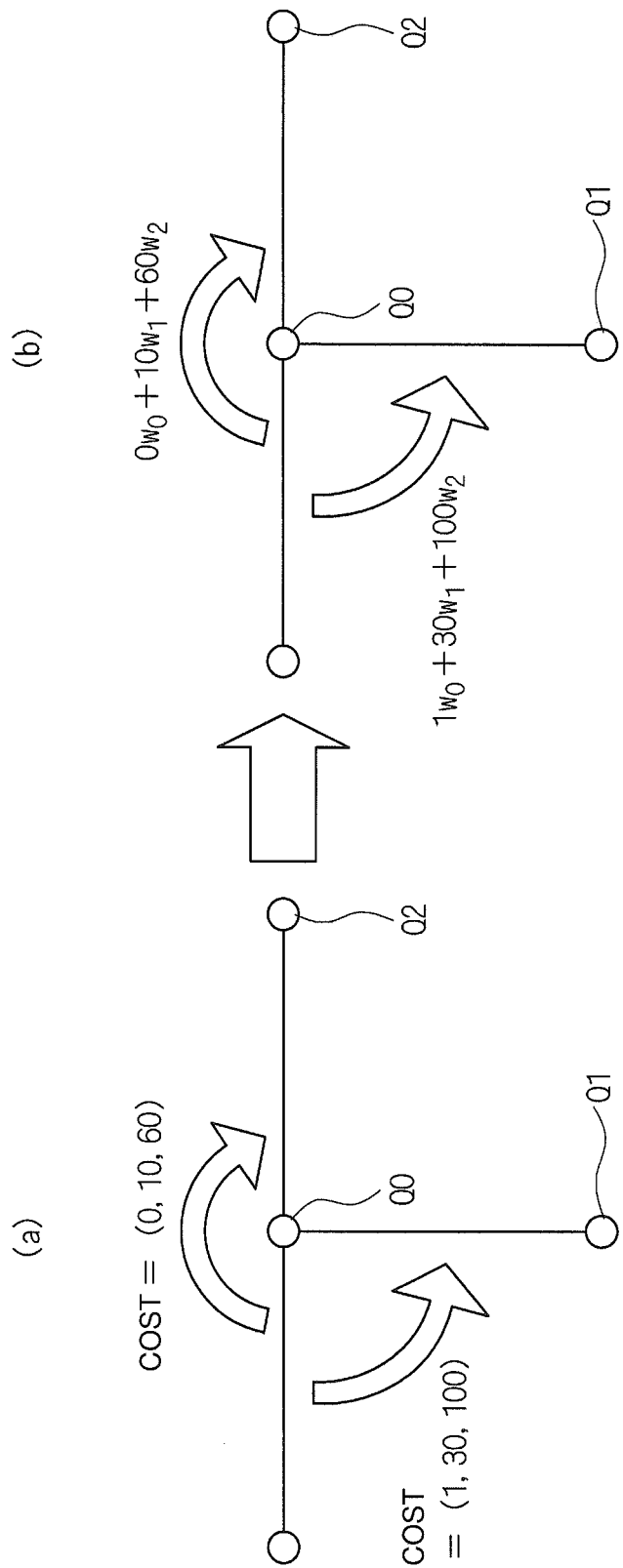
FIG. 5 is a diagram illustrating weighted costs converted from costs acquired in the personality estimation apparatus according to the first embodiment.

As shown in Formula 4, the weights ($w_0, w_1, w_2$) are calculated by dividing the parameters ($\alpha_0, \alpha_1, \alpha_2$) by the smallest number of right/left turns, $S_0$, the shortest time required to reach, $S_1$, and the shortest distance, $S_2$, respectively. FIG. 5 illustrates the weighted cost converted from the costs acquired by the personality estimation apparatus 1 according to the first embodiment.

FIG. 5(a) illustrates the acquired costs in FIG. 3 and FIG. 5(b) illustrates the weighted cost to go straight from intersection Q0 to intersection Q2, obtained by multiplying by weights ($w_0, w_1, w_2$) and the weighted cost to make a right turn to reach intersection Q1, obtained by multiplying by weights ($w_0, w_1, w_2$).

For example, the cost (0, 10, 60) to go straight from intersection Q0 is replaced with the weighted cost $0w_0+10w_1+60w_2$ and the cost (1, 30, 100) to go from Q0 by making a right turn is replaced with the weighted cost $1w_0+30w_1+100w_2$. When the shortest route is to be found, the weighted costs illustrated in FIG. 5(b) and a known method, for example a Dijkstra's algorithm are used to search for and generate the shortest route as a new route.

Returning to FIG. 2, a determination unit 206 determines whether or not the generated new route is identical to the actually selected route. When the determination unit 206 determines that the two routes are not identical, the generated new route is added to the set of the basic routes and the process is repeated to calculate parameters of the evaluation function, generate a new route, and compare the new route with the actually selected route.

When the determination unit 206 determines that the two routes are identical, the determination unit 206 determines the actually selected route to be an optimum route and a parameter storing unit 207 stores the parameters calculated at the time when the generated new route becomes identical to the actually selected route into the storage device 13 as the parameters of the evaluation function.

Determination as to whether a newly generate route is identical to an actually selected route can be made based on whether or not the cost of the shortest route generated as the new route is equal to the cost of the actually selected route. This is because if the cost of the actually selected route that is weighted is optimum, the parameters relating to the actually selected route can be considered to represent the personality of the driver.

Figure 6:
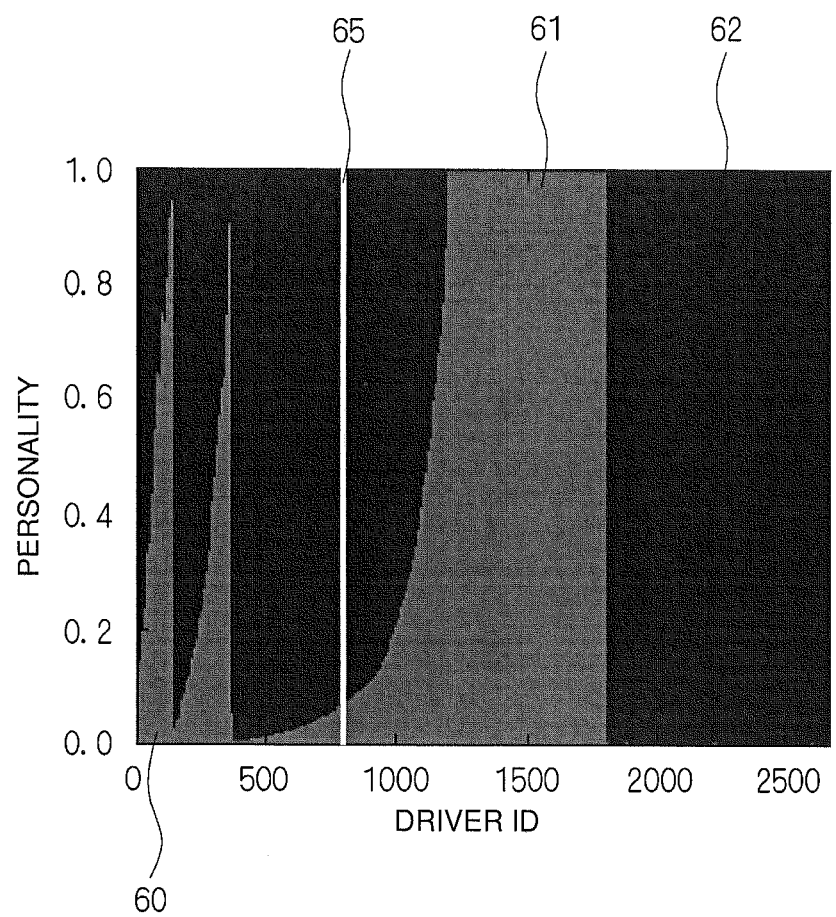
FIG. 6 is a diagram of a parameter distribution calculated in the personality estimation apparatus according to the first embodiment.

The process described above is repeated for all actually selected routes to calculate parameters ($\alpha_0, \alpha_1, \alpha_2$) for each of drivers IDs identifying drivers. FIG. 6 illustrates a parameter distribution calculated in the personality estimation apparatus 1 according to the first embodiment.

As illustrated in FIG. 6, since the sum of the parameters $\alpha_0$, $\alpha_1, \alpha_2$ is '1', classification can be made into the three regions: a region 60 where drivers have tendency to prefer fewer right/left turns, a region 61 where drivers have tendency to prefer shorter times, and a region 62 where drivers have tendency to prefer shorter travel distances.

In the example in FIG. 6, the parameters ($\alpha_0, \alpha_1, \alpha_2$) for the driver ID 65 of a driver sampled can be acquired as parameters (0.1, 0.0, 0.9). The parameters (0.1, 0.0, 0.9) acquired represent the personality of the driver with the driver ID 65. Since the personality of a driver can be readily estimated in this way, a route according to the personality of a driver can be readily generated in a traffic simulation. Furthermore, parameters that match a route actually selected by each driver can be calculated and determination as to whether a route selection model based on the calculated parameters is proper or not can be readily made.

Figure 7:
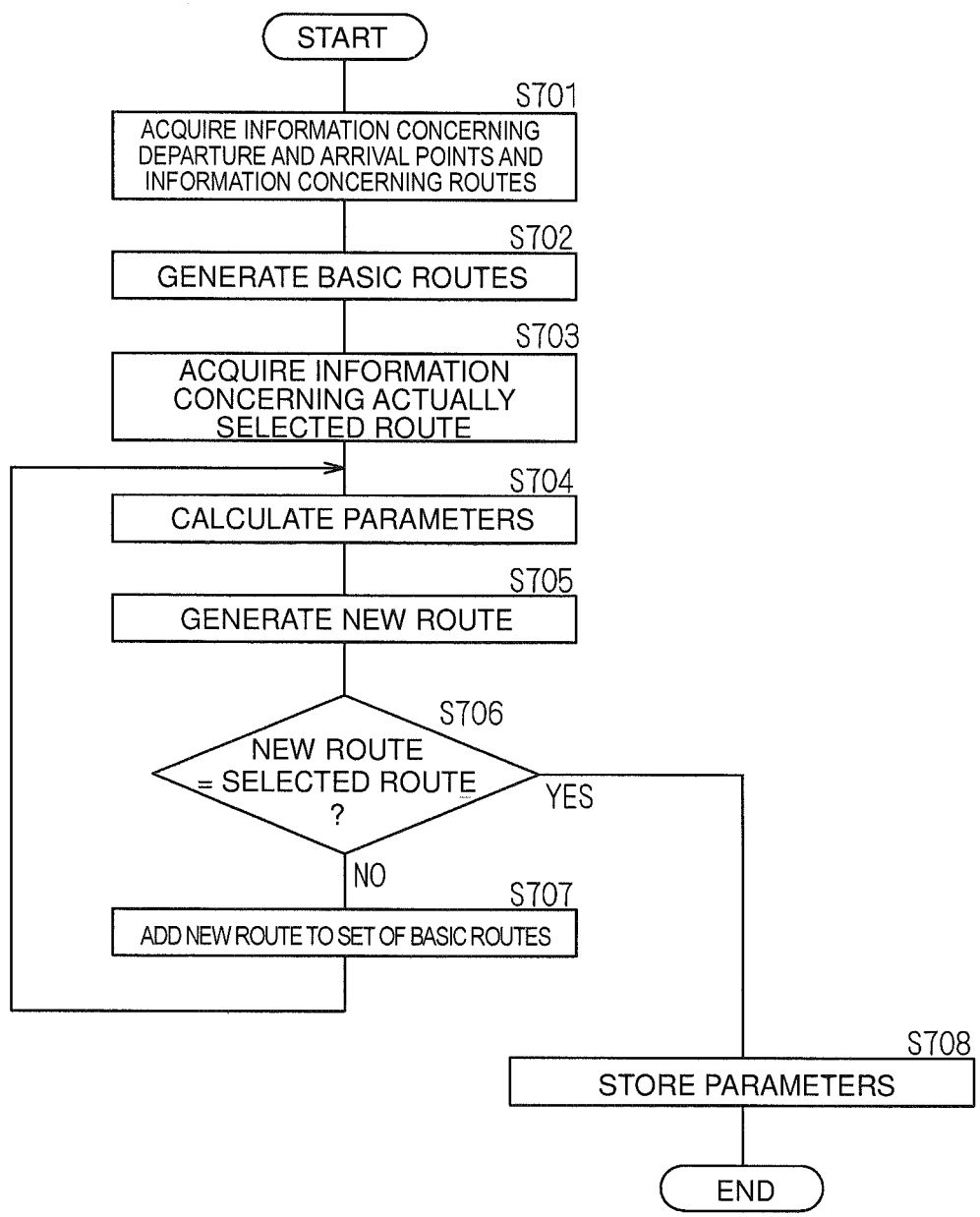
FIG. 7 is a flowchart of a process procedure performed by a CPU of the personality estimation apparatus according to the first embodiment.

FIG. 7 is a flowchart of a process procedure performed by the CPU 11 of the personality estimation apparatus 1 according to the first embodiment. The CPU 11 of the personality estimation apparatus 1 in FIG. 7 acquires information concerning a departure point and an arrival point and information concerning routes from the departure point to the arrival point (operation S701). If the personality of an automobile driver is to be estimated, information acquired may include positional information concerning the departure point, positional information concerning the arrival point, and information concerning routes that can be taken, for example information concerning intersections, distances, and expected required time determined by taking into account the probability of congestion, or the costs between adjacent intersections.

The CPU 11 generates a plurality of basic routes on the basis of the information concerning the departure point and the arrival point and the information concerning the routes from the departure point to the arrival point (operation S702). For example, if the personality of an automobile driver is to be estimated, the basic routes preferably include at least a route with the fewest right/left turns, a fastest route and a shortest route.

The CPU 11 acquires information concerning a route actually selected (operation S703). Specifically, the CPU 11 acquires information concerning which route has been selected in the course of traveling from the departure point to the arrival point.

The CPU 11 calculates the parameters of the evaluation function that yield the actually selected route as an optimum route among the plurality of basic routes and the actually selected route (operation S704). The CPU 11 uses the calculated parameters to generate a new route (operation S705).

The CPU 11 determines whether or not the cost of the generated new route is equal to the cost of the actually selected route (operation S706). Here, the cost of a route is the sum of costs between all successive intersections along the route whose cost is to be calculated. If the CPU 11 determines that the costs are not identical (operation S706: NO), the CPU 11 adds the calculated new route to the set of basic routes (operation S707), then returns to operation S704 and repeats the process described above.

If the CPU 11 determines that the two routes are identical (operation S706: YES), the CPU 11 determines the actually selected route to be optimum and stores the parameters obtained at the time when the two routes have become identical into the storage device 13 as the parameters of the evaluation function (operation S708).

According to the first embodiment, the personality of a driver can be readily estimated and therefore a route according to the personality of the driver can be generated in a traffic simulation. Furthermore, since parameters that match a route actually selected by each individual driver can be calculated and whether a route selection model based on the calculated parameters is proper or not can be readily determined, calibration can be relatively readily performed before the execution of a traffic simulation.

The configuration and functional block diagram of a personality estimation apparatus 1 according to a second embodiment are the same as those of the first embodiment. Therefore, the same reference signs will be used and detailed description of the configuration and functional blocks will be omitted. The second embodiment differs from the first embodiment in that the time required to arrival at the next intersection, which is one factor of costs, is provided by a mixed gamma distribution instead of a constant.

Figure 8:
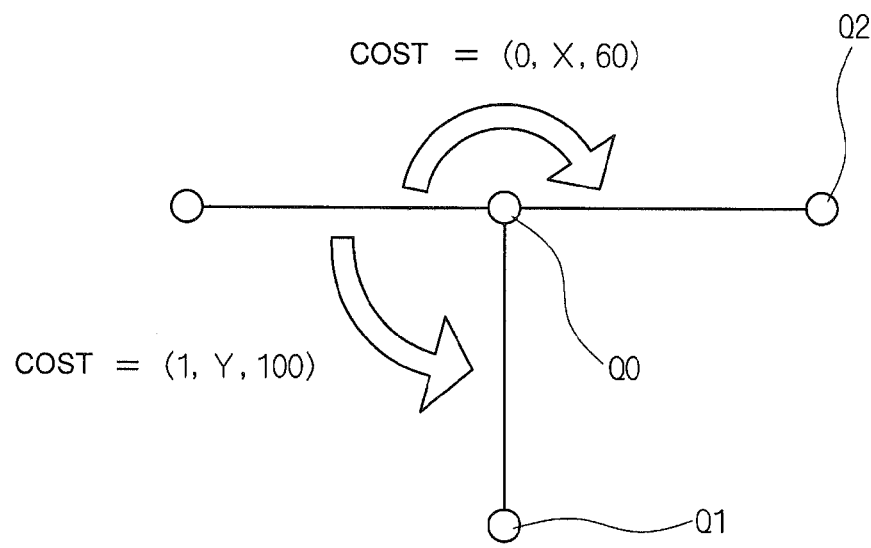
FIG. 8 is a diagram illustrating costs acquired in a personality estimation apparatus according to a second embodiment.

The cost in the second embodiment is a vector value including the number of right and left turns, the time required to arrive at the next intersection provided by a mixed gamma distribution, and the distance to the next intersection. FIG. 8 illustrates an example of costs acquired in the personality estimation apparatus 1 according to the second embodiment.

As illustrated in FIG. 8, the cost, (0, X, 60), required to go straight from intersection Q0 to intersection Q2 is acquired. The first number is a value representing whether a right or left turn is made. The second number 'X' is a random variable representing the time required to arrive at the next intersection. The last number is a value representing the distance to the next intersection. Likewise, the cost required to arrive at intersection Q1 by making a right turn is acquired as (1, Y, 100).

Figure 9:
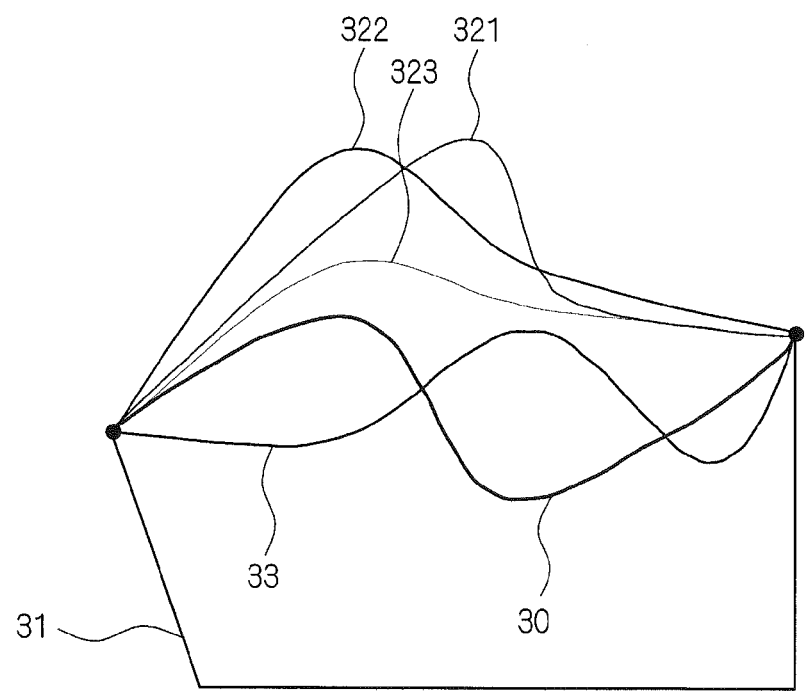
FIG. 9 is a diagram illustrating basic routes generated in the personality estimation apparatus according to the second embodiment.

FIG. 9 illustrates an example of basic routes generated by the personality estimation apparatus 1 according to the second embodiment. As illustrated in FIG. 9, five basic routes, namely the route 31 with the fewest right/left turns, the fastest routes 321, 322 and 323 with the smallest value of the entropic risk measure of the time required to arrive at the arrival point, and a shortest route 33 with the shortest distance to the arrival point, in addition to a route 30 actually selected by a driver. Here, the plurality of fastest routes correspond to different values of the parameters of entropic risk measure and one of the fastest routes is the route with the smallest value of entropic risk measure of a certain parameter of the time required to arrive.

However, if there are no differences among the route 31 with the fewest right/left turns, the fastest routes 321, 322 and 323 and the shortest route 33, the personality of the driver cannot be estimated. In that case, the actually selected route 30 may be excluded from the routes from which the personality of the driver is estimated.

In the personality estimation apparatus 1, a route selection information acquisition unit 203 acquires information concerning an actually selected route and a parameter calculation unit 204 calculates parameters of an estimation function that yield the actually selected route as an optimum route among a plurality of basic routes and the actually selected route.

Specifically, parameters ($\alpha_0$, $\alpha_1$, $\alpha_2$, $\alpha_3$, $\alpha_4$) that yield an actually selected route as an optimum evaluation value of the evaluation function f ($\alpha_0$, $\alpha_1$, $\alpha_2$, $\alpha_3$, $\alpha_4$) shown in Formula 5 are calculated. The sum of the parameters, $\alpha_0$, $\alpha_1$, $\alpha_2$, $\alpha_3$, and $\alpha_4$ is '1'. Parameter $\alpha_0$ represents the parameter for the number of right/left turns, parameters $\alpha_1$, $\alpha_2$ and $\alpha_3$ represent the parameters for the arrival time, and parameter $\alpha_4$ represents the parameter for the distance. That is, it can be determined based on the proportion of the magnitudes of parameters ($\alpha_0$, $\alpha_1$, $\alpha_2$, $\alpha_4$) which of fewer right/left turns, a shorter time required to travel to the arrival point, and shorter travel distance the driver tends to prefer.

In Formula 5, i is a natural number that distinguishes among a plurality of routes 1, 2, and so on. $C_0^{(i)}$ represents the number of right/left turns along route i, $C_1^{(i)}$, $C_2^{(i)}$ and $C_3^{(i)}$ represent the amounts of time required to arrive at the arrival point along the route i, and $C_4^{(i)}$ represents the travel distance along the route i. $C_0^{(i)}$, $C_1^{(i)}$, $C_2^{(i)}$, $C_3^{(i)}$ and $C_4^{(i)}$ are values normalized by dividing by the smallest number of right/left turns, $S_0$, the shortest time required to arrive at the arrival point, $S_1$, $S_2$, $S_3$, and the shortest distance to the arrival point, $S_4$, respectively. The parameters ($\alpha_0$, $\alpha_1$, $\alpha_2$, $\alpha_3$, $\alpha_4$) are non-negative real numbers smaller than or equal to 1 and the sum of the parameters is '1'.

Formula 5

$$f(\alpha_0, \alpha_1, \alpha_2, \alpha_3, \alpha_4) = \alpha_0 C_0^{(i)}/S_0 + \alpha_1 C_1^{(i)}/S_1 + \alpha_2 C_2^{(i)}/S_2 + \alpha_3 C_3^{(i)}/S_3 + \alpha_4 C_4^{(i)}/S_4 \quad \text{(Formula 5)}$$

The parameters ($\alpha_0$, $\alpha_1$, $\alpha_2$, $\alpha_3$, $\alpha_4$) that yield an actually selected route as an optimum evaluation value in the evaluation function f ($\alpha_0$, $\alpha_1$, $\alpha_2$, $\alpha_3$, $\alpha_4$) in Formula 5 can be calculated by solving the linear programming problem shown in Formula 6. In particular, it is only necessary to calculate parameters that minimize the difference $\epsilon$ between an evaluation value calculated for a basic route and an evaluation value calculated for a route actually selected.

Formula 6

$$\min. \varepsilon \quad \text{(Formula 6)}$$
$$\text{s.t.} \sum_{j=0}^{2+n} \alpha_j = 1$$
$$\alpha_j \geq 0, \text{ for } j = 0, 1, 2, \ldots, 2+n$$
$$\sum_{j=0}^{2+n} \frac{C_j^{(i)}}{S_j} \alpha_j + \varepsilon \geq \sum_{j=0}^{2+n} \frac{C_j^{(0)}}{S_j} \alpha_j, \text{ for } i = 1, 2, \ldots$$

The first term on the left-hand side of the fourth formula in Formula 6 represents the sum of the costs calculated for the basic routes; the right-hand side represents the sum of the costs calculated for a route actually selected, and $\epsilon$ represents the difference between the sums. Parameters ($\alpha_0$, $\alpha_1$, $\alpha_2$, $\alpha_3$, $\alpha_4$) that yield the smallest difference $\epsilon$ are simply calculated.

It is possible that none of $\alpha_0$, $\alpha_1$, $\alpha_2$, $\alpha_3$, and $\alpha_4$ in the parameters ($\alpha_0$, $\alpha_1$, $\alpha_2$, $\alpha_3$, $\alpha_4$) calculated according to Formula 6 is zero. However, there can be a situation where a solution in which at most one of the parameters $\alpha_1$, $\alpha_2$ and $\alpha_3$ for the time required to arrive is no-zero is to be obtained. In that case, two equations, $\alpha_2=0$ and $\alpha_3=0$, are first added to Formula 6 to calculate parameters so that only $\alpha_1$ of the parameters for the time required to arrive is allowed to be non-zero. Likewise, parameters are calculated so that only one of $\alpha_2$ and $\alpha_3$ is allowed to be non-zero. Finally, a parameter that minimizes the objective function is found among a plurality of parameters thus calculated.

The personality of the driver can be more effectively reflected in the optimum solution to the linear programming problem by obtaining as the solution to a quadratic programming problem. The solution to the quadratic programming problem can be obtained according to Formula 7. Formula 7 is similar to Formula 6 except that the second term is added to the first formula in Formula 6.

Formula 7

$$\min. \varepsilon + \lambda \sum_{j=0}^{2+n} \alpha_j^2 \quad \text{(Formula 7)}$$
$$\text{s.t.} \sum_{j=0}^{2+n} \alpha_j = 1$$
$$\alpha_j \geq 0, \text{ for } j = 0, 1, 2, \ldots, 2+n$$
$$\sum_{j=0}^{2+n} \frac{C_j^{(i)}}{S_j} \alpha_j + \varepsilon \geq \sum_{j=0}^{2+n} \frac{C_j^{(0)}}{S_j} \alpha_j, \text{ for } i = 1, 2, \ldots$$

The calculated parameters are used to generate a new route. The generated route is dependent on the personality of the driver. Specifically, the calculated parameters ($\alpha_0$, $\alpha_1$, $\alpha_2$, $\alpha_3$, $\alpha_4$) are multiplied by weights ($w_0$, $w_p$, $w_4$) to obtain weighted costs to replace. Here, $w_0$, $w_1$, $w_2$, $w_3$ and $w_4$ are calculated in the same way as in Formula 4 and $w_p$ represents the maximum value of $w_1$, $w_2$ and $w_3$.

Figure 10:
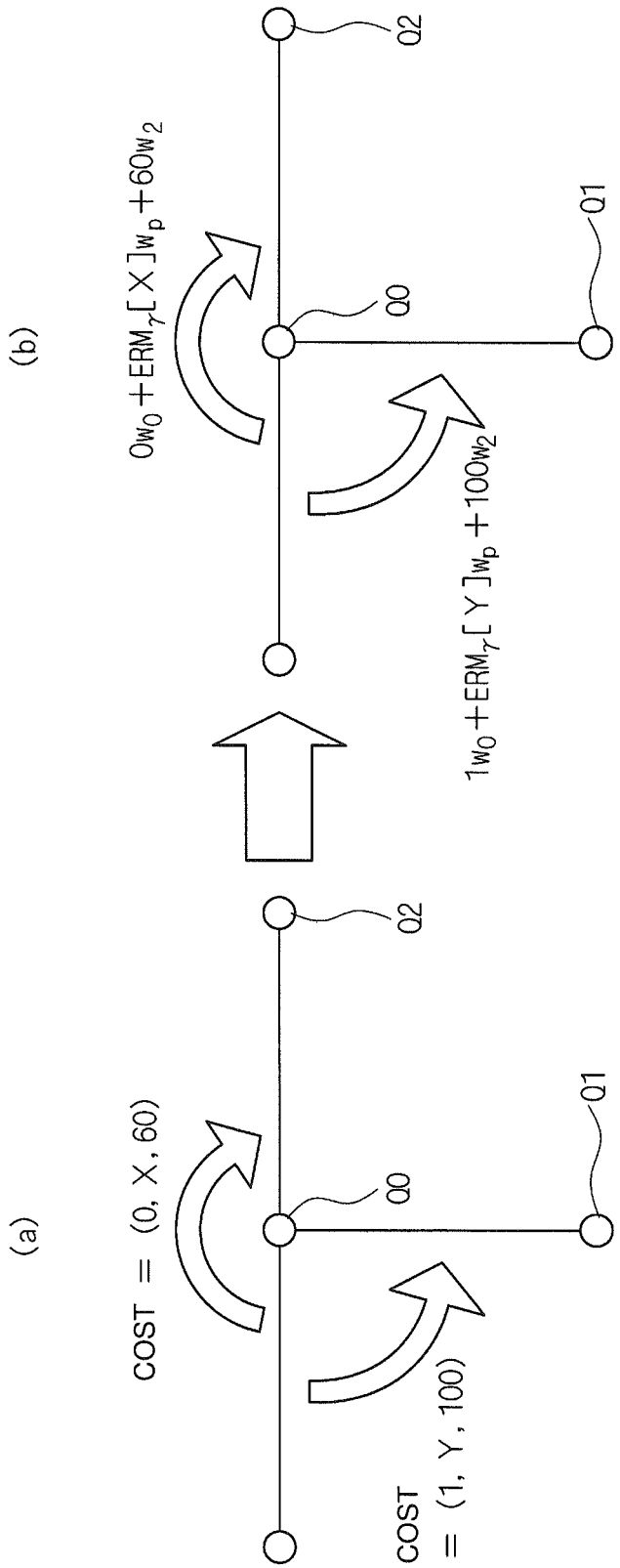
FIG. 10 is a diagram illustrating weighted costs converted from costs acquired in the personality estimation apparatus according to the second embodiment.

FIG. 10 illustrates weighted cost converted from the costs acquired by the personality estimation apparatus 1 according to the second embodiment. FIG. 10(a) illustrates the costs acquired in FIG. 8. FIG. 10(b) illustrates weighted costs obtained by multiplying the cost to go straight from intersection Q0 to intersection Q2 by weights ($w_0$, $w_p$, $w_4$) and multiplying the cost to make a right turn to go to intersection Q1 by ($w_0$, $w_p$, $w_4$). For example, the cost (0, X, 60) to go straight from intersection Q0 is replaced with a weighted cost, $0w_0$+ERM$_\gamma$[X]$w_p$+$60w_2$, and the cost (1, Y, 100) to make a right turn is replaced with a weighted cost, $1w_0$+ERM$_\gamma$[Y]$w_p$+$100w_2$. To find the shortest route, the weighted costs illustrated in FIG. 10(b) and a known method, for example the Dijkstra's algorithm, are used to search for and generate the shortest route as a new route.

Here, ERM$_\gamma$[X] and ERM$_\gamma$[Y] are values of the entropic risk measure of a parameter $\gamma$ for cost X and Y, respectively, determined by a probability distribution of amounts of time required to reach the next intersection and can be calculated according to Formula 8. The parameter γ is a parameter value of the entropic risk measure that corresponds to the maximum weight $w_p$. For example, if there are three fastest routes, namely a route that minimizes the value of the entropic risk measure with a parameter γ of '−1', a route that minimizes the value of the entropic risk measure with a parameter γ of '1', and a route that minimizes the value of the entropic risk measure with a parameter γ of '2', then the parameter γ is set to '=1' when $w_1$ is the maximum value among $w_1$, $w_2$ and $w_3$, set to '1' when $w_2$ is the maximum value, and set to '2' when $w_3$ is the maximum value. Here, p, k and θ are parameters of a mixed gamma distribution and represent parameters of the gamma distribution that are kη and θη with a probability pη for η=1, 2, . . .

Formula 8

$$ERM_\gamma[X] = \frac{1}{\gamma}\ln E[\exp(\gamma X)] \quad \text{(Formula 8)}$$

$$= \frac{1}{\gamma}\ln\sum_{\eta=1}^{n}\frac{p_\eta}{(1-\gamma\theta_\eta)^{k_\eta}}$$

where $ERM_0[X] \equiv \sum_{\eta=1}^{n} p_\eta k_\eta \theta_\eta$

Then, as in the first embodiment, the determination unit 206 determines whether the generated new route is identical to the actually selected route. If the determination unit 206 determines that the route is not identical to the actually selected route, the generated new route is added to the set of the basic routes and the process is repeated to calculate parameters of the evaluation function, generate a new route, and compare the new route with the actually selected route.

If the determination unit 206 determines that the two routes are identical, the determination unit 206 determines the actually selected route to be the optimum route and the parameter storing unit 207 stores the parameters obtained at the time when the two routes have become identical into the storage device 13 as the parameters of the evaluation function.

According to the second embodiment, the personality of a driver can be readily estimated and therefore a route according to the personality of the driver can be generated in a traffic simulation. Furthermore, since parameters that match a route actually selected by each individual driver can be calculated and whether a route selection model based on the calculated parameters is proper or not can be readily determined, calibration can be relatively readily performed before the execution of a traffic simulation.

The present embodiments were applied to taxis driving in an urban center. The result will be described below. Probe car data concerning the taxis during one day was acquired, 1,858 routes were extracted, and the personality of each of the drivers was estimated.

The personality of each of the drivers was represented as the sum of weighted values of the following four entropic risk measures: the number of left/right turns, the arrival time when the driver drives at legal speeds, the travel distance, and the required time. Eleven parameters could be considered with the entropic risk measures. The result was that an actually selected route minimized the sum of the weighted values of the four measures for 1,247 routes (67.1%). In other words, four measures that yield an actually selected route as an optimal route for the driver were able to be calculated.

The present disclosure is not limited to the embodiments described above but various modifications and improvement are possible without departing from the spirit. For example, while the first and second embodiments have been described with examples applied to traffic simulations of automobile driving, the present embodiments are applicable not only to human behavioral models where a departure point and an arrival point exist but also to any behavioral models.

The invention claimed is:

1. A method for estimating a parameter of an evaluation function used for selecting a route from a departure point to an arrival point, the method comprising:
    acquiring, with a processing device, information concerning a departure point and an arrival point and information concerning a route from the departure point to the arrival point;
    generating a plurality of basic routes on the basis of the acquired information concerning the departure point and the arrival point and the acquired information concerning the route from the departure point to the arrival point;
    acquiring information concerning a route actually selected;
    calculating a parameter of an evaluation function that yields the actually selected route as an optimum route among the plurality of basic routes and the actually selected route;
    generating a new route using the calculated parameter;
    determining whether or not the generated new route is identical to the actually selected route;
    on a condition that it is determined that the generated new route is not identical to the actually selected route, adding the generated new route to the basic routes, calculating a parameter of the evaluation function anew, repeating generation of a new route, and comparing the generated new route with the actually selected route; and
    on a condition that it is determined that the generated new route is identical to the actually selected route, storing the parameter at the time when the new data becomes identical to the actually selected route as a parameter of the evaluation function.

2. The method according to claim 1, wherein:
    the information concerning the route from the departure point to the arrival point is acquired as a cost incurred if the route is selected; and
    the parameter is calculated as a coefficient by which the cost of each route in the evaluation function is to be multiplied, by optimizing the evaluation function by a linear programming.

3. The method according to claim 1, wherein the basic routes include at least a route with the fewest left and/or right turns, a fastest route, and a shortest route.

4. An apparatus for estimating a parameter of an evaluation function used for selecting a route from a departure point to an arrival point, comprising:
    an information acquisition unit configured to acquire information concerning a departure point and an arrival point and information concerning a route from the departure point to the arrival point;
    a basic route generation unit configured to generate a plurality of basic routes on the basis of the acquired information concerning the departure point and the arrival point and the acquired information concerning the route from the departure point to the arrival point;
    a route selection information acquisition unit configured to acquire information concerning a route actually selected;
    a parameter calculation unit configured to calculate a parameter of an evaluation function that yields the actually selected route as an optimum route among the plurality of basic routes and the actually selected route;

a route generation unit configured to generate a new route using the calculated parameter;

a determination unit configured to determine whether or not the generated new route is identical to the actually selected route;

a repetition unit configured to, on a condition that the determination unit determines that the generated new route is not identical to the actually selected route, add the generated new route to the basic routes, calculate a parameter of the evaluation function anew, repeat generation of a new route, and compare the generated new route with the actually selected route; and a parameter storage unit configured to, on a condition that the determination unit determines that the generated new route is identical to the actually selected route, store the parameter at the time when the new data becomes identical to the actually selected route as a parameter of the evaluation function.

5. The apparatus according to claim 4, wherein:
the information acquisition unit acquires the information concerning the route from the departure point to the arrival point as a cost incurred if the route is selected; and
the parameter calculation unit calculates the parameter as a coefficient by which the cost of each route in the evaluation function is to be multiplied, by optimizing the evaluation function by a linear programming.

6. The apparatus according to claim 4, wherein the basic routes include at least a route with the fewest left and/or right turns, a fastest route, and a shortest route.

7. A computer readable storage medium having computer readable code stored thereon that, when executed by a computer, implement method for estimating a parameter of an evaluation function used for selecting a route from a departure point to an arrival point, the method comprising:
acquiring, with a processing device, information concerning a departure point and an arrival point and information concerning a route from the departure point to the arrival point;
generating a plurality of basic routes on the basis of the acquired information concerning the departure point and the arrival point and the acquired information concerning the route from the departure point to the arrival point;
acquiring information concerning a route actually selected;
calculating a parameter of an evaluation function that yields the actually selected route as an optimum route among the plurality of basic routes and the actually selected route;
generating a new route using the calculated parameter;
determining whether or not the generated new route is identical to the actually selected route;
on a condition that it is determined that the generated new route is not identical to the actually selected route, adding the generated new route to the basic routes, calculating a parameter of the evaluation function anew, repeating generation of a new route, and comparing the generated new route with the actually selected route; and
on a condition that it is determined that the generated new route is identical to the actually selected route, storing the parameter at the time when the new data becomes identical to the actually selected route as a parameter of the evaluation function.

8. The computer readable storage medium according to claim 7, wherein:
the information concerning the route from the departure point to the arrival point is acquired as a cost incurred if the route is selected; and
the parameter is calculated as a coefficient by which the cost of each route in the evaluation function is to be multiplied, by optimizing the evaluation function by a linear programming.

9. The computer program product according to claim 7, wherein the basic routes include at least a route with the fewest left and/or right turns, a fastest route, and a shortest route.

10. A method for estimating a parameter of an evaluation function used for selecting one element or a combination of a plurality of elements, the method comprising:
acquiring, with a processing device, information concerning each of the elements;
generating a basic set including a selectable one element or a selectable combination of a plurality of elements on the basis of the acquired information concerning each of the elements;
acquiring information concerning one actually selected element or an actually selected combination of a plurality of elements; and
calculating a parameter of the evaluation function that yields the actually selected one element or the actually selected combination of a plurality of elements as an optimum one among the basic set.

11. The method according to claim 10, wherein each of the elements is a road between two intersections and the one element or the combination of a plurality of elements is a route that is a combination of the roads.

12. The method according to claim 10, further comprising:
generating one element or a combination of a plurality of elements anew by using a calculated parameter of the evaluation function;
adding the generated new one element or combination of elements to the basic set; and
calculating a parameter of the evaluation function that yields actually selected one element or an actually selected combination of elements as an optimum element or combination in the basic set including the generated new one element or combination of elements.

13. The method according to claim 12, further comprising recursively repeating:
generating one element or a combination of a plurality of elements anew by using a calculated parameter of the evaluation function;
adding the generated new one element or combination of elements to the basic set; and
calculating a parameter of the evaluation function that yields actually selected one element or an actually selected combination of elements as an optimum element or combination in the basic set including the generated new one element or combination of elements.

14. The method according to claim 13, further comprising:
determining whether or not a generated new one element or combination of a plurality or elements is identical to actually selected one element or combination of elements; and
on a condition that the generated new one element or combination of elements are determined to be identical to the actually selected element or combination of elements, storing a parameter at the time when the element or combination of elements becomes identical to the actually selected element or combination of elements as a parameter of the evaluation function.

* * * * *